United States Patent [19]

Imbeninato et al.

[11] 4,383,452

[45] May 17, 1983

[54] TRANSFER MECHANISM FOR A GYROSCOPIC DEVICE

[75] Inventors: Paul A. Imbeninato, Lyndhurst; Richard H. Wolff, Hillsdale, both of N.J.

[73] Assignee: The Bendix Corporation, Teterboro, N.J.

[21] Appl. No.: 203,011

[22] Filed: Nov. 3, 1980

[51] Int. Cl.³ ............................................. G01C 19/30
[52] U.S. Cl. ..................................... 74/5.47; 33/324; 74/5.41
[58] Field of Search ......................... 74/5.47, 5.9, 5.41; 33/318, 324

[56] References Cited

U.S. PATENT DOCUMENTS

| 2,976,618 | 3/1961 | Campbell et al. | 33/324 |
| 3,394,596 | 7/1968 | Wehde et al. | 33/318 X |
| 4,087,919 | 5/1978 | Huvers | 33/324 X |
| 4,158,261 | 6/1979 | Auer | 33/324 |
| 4,321,678 | 3/1982 | Krogmann | 33/324 |

Primary Examiner—Rodney H. Bonck
Attorney, Agent, or Firm—Anthony F. Cuoco; Thomas L. Adams

[57] ABSTRACT

A transfer mechanism can rotate a gyroscopic device about its spin axis. The mechanism has a support that rotatably supports the gyroscopic device. This mechanism also has restraint apparatus for holding the gyroscopic device in one of two angularly displaced positions. The mechanism includes also a driver such as a stepper motor for driving the gyroscopic device between the two angularly displaced positions. In one embodiment the input axis of a gyroscope is moveable between a vertical and horizontal position to change the mode of operation from direction finding to north seeking, respectively.

13 Claims, 1 Drawing Figure

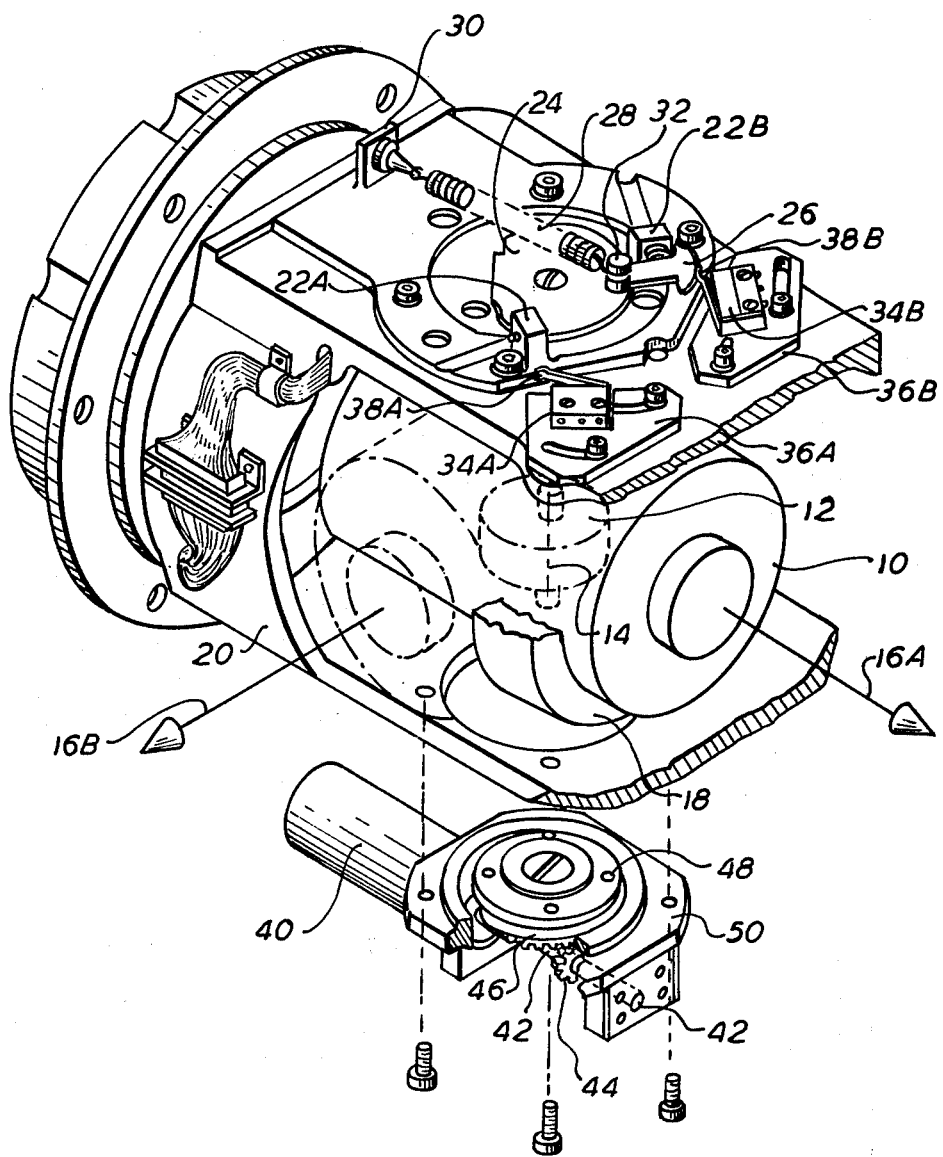

TRANSFER MECHANISM FOR A GYROSCOPIC DEVICE

BACKGROUND OF THE INVENTION

The present invention relates to transfer mechanisms for a gyroscope and in particular to a driving motor for rotating the input axis of a gyroscope between vertical and horizontal.

It is known to employ a gyroscope to perform direction finding. For example, the input axis of a gyroscope can be vertically aligned, the output axis being used to measure the rate of azmuthal rotation of the gyroscope. It is also known to use a gyroscope to seek north by sensing the rotation of the earth. This known gyroscope has a horizontal input axis for sensing the direction of the horizontal component of the earth's rotation, nominally north. This gyroscope is rotated until its input axis is transverse to the spin axis of the earth to produce a null and thus find north.

In the past two different gyroscopes were employed to perform direction finding and north seeking. Reorienting an operating gyroscope to change its mode of operation is complicated because of the need for quick and accurate realignment without introducing harmful accelerations or shock. A conventional solution might employ a servo motor whose rate is controlled. However, such equipment would be complicated and bulky and therefore clutter the very limited space in which the gyroscope and the attached mechanism must operate.

Thus, there is a need to properly reposition a gyroscopic device to change its mode of operation. This transfer mechanism ought to operate without subjecting the gyroscope to harmful stresses or shocks.

SUMMARY OF THE INVENTION

In accordance with the illustrative embodiment demonstrating the features and advantages of the present invention, there is provided a transfer mechanism for rotating a gyroscopic device about its spin axis. The transfer mechanism includes a support means, a restraint means, and a drive means. The support means can rotatably support the gyroscopic device. The restraint means can hold the gyroscopic device in one of two angularly displaced positions. The drive means is operable to drive the device between the two angularly displaced positions.

An associated two step method changes a gyroscopic device, which is rotatably mounted in a support, between a directional and a north seeking mode of operation. The spin axis of the gyroscopic device is horizontally aligned in a predetermined relation to the spin axis of the earth. In the other step, the gyroscopic device is rotated within support 90 degrees about its spin axis.

Accordingly, gyroscopic equipment and methods according to the present invention provide a simple technique for altering the mode of operation of a gyroscope between a north seeking and a direction finding mode. In a preferred embodiment a gyroscope having a horizontal spin axis can have its input axis translatable between a vertical and a horizontal position. With a horizontal input axis the gyroscope is sensitive to the horizontal component of the rotation of the earth and operates as a north seeking gyro. In this instance, the gyroscope can be azimuthally rotated to produce a null signal when the input axis of the gyroscope is transverse to the spin axis of the earth. When the input axis of the gyroscope is vertical it can operate as a conventional directional gyroscope. In the preferred embodiment a stepper motor rotates the gyroscope 90 degrees into one of a pair of stops. The stepper motor is preferred since its rate of rotation can be readily controlled by the expedient of providing driving pulses at a fixed repetition rate. Otherwise, a servo motor employing rate feedback circuitry and occupying considerable space is necessary. In this embodiment an overcenter spring attached to a cam can rotate and hold the gyroscope in two orthogonal positions. These detent positions of the gyroscope avoid the need for continuously applying power to the stepper motor after repositioning solely to maintain the new position. This cam actuates a microswitch at the end of its travel to remove power from the stepper motor for the reasons previously given.

The apparatus may be mounted in a stabilized platform of a vehicle to maintain the spin axis of the gyroscope horizontal notwithstanding changes in pitch and roll.

BRIEF DESCRIPTION OF THE DRAWINGS

The above brief description as well as other objects, features and advantages of the present invention will be fully appreciated by reference to the following detailed description of a presently preferred but nonetheless illustrative embodiment in accordance with the present invention when taken in conjunction with the accompanying drawing which is an exploded perspective view, partially broken away, illustrating the present invention.

DETAILED DESCRIPTION OF THE PREFERRED EMBODIMENT

Referring to the drawing, a transfer mechanism and gyroscopic device according to the present invention is illustrated. A gyroscopic device shown herein as gyroscope 10, has an element 12 (shown in phantom) that spins along spin axis 14. When positioned as shown (solid lines) gyroscope 10 has an output axis along vector 16A and an input axis along vector 16B. In a well understood manner gyroscope 10 will apply an output torque on an internal transducer (not shown) about output axis 16A in response to rotation of gyroscope 10 about its input axis 16B. Thus, integration of the output torque is a measure of angular displacement. If the measured rotation is azimuthal, gyroscope 10 is operating directionally. Alternatively, by measuring rotation of the earth with respect to the input axis, gyroscope 10 acts in a north seeking mode. Gyroscope 10 is mounted in a gyro support gimbal 18 to allow rotation of gyroscope 10 about spin axis 14. Gimbal 18 allows 90° C. of rotation so gyroscope 10 can turn to its alternate position (shown in phantom) thereby shifting its output axis from vector 16A to 16B. Support gimbal 18 is rotatably mounted on a support means shown herein as inner gimbal 20. Gimbal 20 acts as primary support for the equipment illustrated herein. Gimbal 20 is rotatably mounted by a bearing to other apparatus (not shown) to allow the entire illustrated assembly to rotate about axis 16A.

A restraint means is shown herein comprising a pair of spaced stopping members 22A and 22B. Members 22A and 22B are stops carrying threaded projections that extend an adjustable amount. Cam 24 is mounted on gyroscope 10 to rotate therewith about spin axis 14. A projection 26 on cam 24 engages stops 22A and 22B to restrict the rotation of gyroscope 10 to 90 degrees of travel. The foregoing restaint means includes a detent means shown herein as a yieldable member comprising expansion spring 28 stretched between post 30 attached to gimbal 20 and post 32 attached to cam 24. So installed spring 28 pulls extension 26 of cam 24 from an intermediate position against either stop 22A or, as shown, stop 22B.

A pair of terminal switches are shown herein as microswitches 34A and 34B. Switches 34A and 34B are mounted on adjustment plates 36A and 36B, respectively, which are fixed to gimbal 20 by screws fitting through slots in the plates. Switches 34A and 34B are operated by depressing arms 38A and 38B, respectively, through extension 26.

Mounted on gimbal 20 is a drive means shown herein as stepper motor 40. Mounted on the end of output shaft 42 of stepper motor 40 is pinion gear 44. Sector gear 46 engages pinion gear 44 and is attached by means of screw holes such as screw hole 48 to support gimbal 18 to rotate it and gyroscope 10. Motor 40 and sector gear 46 are mounted on carrier plate 50 which bolts to the side of gimbal 20 is illustrated. Stepper motor 40, a conventional motor, advances by a given angular increment in response to well known driving pulses being applied to its driving circuitry (not shown). Thus output shaft 42 can rotate at a angular velocity proportional to the pulse rate applied to its driving circuitry.

The apparatus illustrated herein may be mounted in a stabilized platform (not shown) to keep spin axis 14 horizontal although a vehicle carrying the illustrated equipment pitches or rolls.

To facilitate an understanding of the principles associated with the foregoing apparatus, its operation will be briefly described. The output axis of gyroscope 10 may be initially aligned to either axis 16A or 16B depending upon the chosen mode of operation. These angular positions can be accurately set by adjusting the illustrated adjustment screws in stops 22A and 22B. Spring 28 holds cam extension 26 (and thus gyroscope 10) against the screws of stop 22A or 22B. Gyroscope 10 and gimbal 20 are mounted in a stabilized platform so that spin axis 14 is kept horizontal and vector 16A is vertical. With gyroscope 10 oriented as shown, its input axis is horizontal and can therefore sense rotation of the earth.

In a conventional manner, gimbal 20 is azimuthally rotated about vector 16A by a servo (not shown) to transversely orient the input axis of gyroscope 10 to the spin axis of the earth. Such orientation nulls the output torque produced from the gyroscope 10 and corresponds to locating north.

When an operator wishes to reorient gyroscope 10 and perform direction finding, stepper motor 40 is repetitively pulsed in a conventional manner to angularly increment its output shaft. In one embodiment, the pulse rate applied to stepper motor 40 and the gear ratio of gears 44 and 46 are such that gyroscope 10 rotates 90 degrees in approximately 6 seconds. This rate is sufficiently slow that relatively little acceleration force is applied to gyroscope 10 so that the gimbal bearings are not unduly stressed. Gyroscope 10 and cam 24 simultaneously rotate about spin axis 14. Accordingly, post 32 moves outwardly to stretch spring 28 and resist rotation. As it travels past some intermediate position, spring 28 then commences to relax and applies a force to cam 24 tending to assist its rotation. Before reaching stop 22A, extension 26 depresses lever 38A of microswitch 34A causing removal of power from stepper motor 40. Once power has been thus removed, spring 28 pulls extension 26 and cam 24 into stop 22A and holds it in that position. Accordingly, gyroscope 10 has been rotated 90 degrees so that its output axis has been shifted from axis 16A to 16B. Therefore, the input axis of gyroscope 10 is now vertical so that gyroscope 10 becomes sensitive to azimuthal rotation of gimbal 20 caused by a change in the direction of a vehicle carrying the illustrated apparatus. Thus, gyroscope 10 is now reoriented so it can act as a direction finding gyroscope.

It is to be appreciated that various modifications may be implemented with respect to the above described embodiment. For example, the gear train shown herein may take many alternate forms with different gear ratios. In addition in some embodiments the gear train may be eliminated so the stepper motor directly moves the gyro. Also, alternative detent mechanisms may be employed to keep the gyroscope in the preselected positions. Furthermore, it is anticipated that for some embodiments the gyroscope may be rotated 270 degrees, to accomplish a 90 degrees displacement. Also, the gyroscope may be capable of rotating 360 degrees but ought to have a restraining mechanism to keep it in one of two preset positions. Moreover, the illustrated terminal switches may be eliminated in those embodiments where the stepper motor is deenergized after application of a predetermined number of pulses or where continuous application of power is permissible.

Obviously, many other modifications and variations of the present invention are possible in light of the above teachings. It is therefore to be understood that within the scope of the appended claims, the invention may be practiced otherwise than as specifically described.

What is claimed is:

1. A transfer mechanism for rotating a gyroscopic device about its spin axis comprising:
    support means for rotatably supporting said gyroscopic device;
    restraint means for passively holding said device in one of two angularly displaced positions; and
    drive means for driving said device between said two angularly displaced positions, said drive means being operable in response to timing signals of a given repetition rate applied thereto to rotate said device at a rate of rotation proportional to said given repetition rate, said drive means including means for interrupting the drive applied to said device upon its arriving in the vicinity of each of said two angularly displaced positions.

2. A transfer mechanism according to claim 1 wherein said two angularly displaced positions correspond to orientations of said gyroscopic device suitable for direction finding and for north-seeking.

3. A transfer mechanism according to claim 2 wherein said two angularly displaced positions are displaced substantially 90°.

4. A transfer mechanism according to claim 1 or 3 wherein said drive means comprises a stepper motor.

5. A transfer mechanism according to claim 3 wherein said restraint means includes:
    a cam mounted on said gyroscopic device for rotation therewith; and
    a pair of spaced stopping members positioned to engage and stop said cam upon said device arriving at said two angularly displaced positions.

6. A transfer mechanism according to claim 5 wherein said restraint means includes:

detent means for mechanically and passively urging said gyroscopic device away from an intermediate position toward said two angularly displaced positions.

7. A transfer mechanism according to claim 6 wherein said detent means includes:

a yieldable member mounted between said cam and said support means.

8. A transfer mechanism according to claim 5 wherein said drive means includes:

a pair of terminal switches each mounted alongside a different corresponding one of said stopping members, said switches being connected to said drive means for disabling it upon arrival of said cam at either one of said stopping members.

9. A transfer mechanism according to claim 8 wherein said drive means includes:

a stepper motor having an output shaft;
 a pinion gear mounted on said output shaft; and
 a sector gear mounted on said gyroscopic device, said sector gear engaging said pinion gear.

10. A transfer mechanism for rotating about a horizontal axis a gyroscopic device to change its input axis between vertical and horizontal, comprising:

a gimbal for rotatably supporting said gyroscopic device;
 a pair of stops mounted on said gimbal and positioned to engage said gyroscopic device and restrict the rotational travel of said gyroscopic device within said gimbal to 90°;
 a stepper motor coupled to said gyroscopic device for rotating it;
 a spaced pair of terminal switches actuable by rotation of said gyroscopic device and each positioned with respect to a different respective one of said stops to deenergize said stepper motor upon said gyroscopic device arriving in the vicinity of the associated one of said stops; and
 a spring connected between said gimbal and said gyroscopic device for urging the latter from an intermediate position toward the nearer one of said stops.

11. A transfer mechanism for rotating a gyroscopic device about its spin axis comprising:

support means for rotatably supporting said gyroscopic device;
 mechanical means for passively holding said device in one of two angularly displaced positions; and
 drive means for driving said device between said two angularly displaced positions, said drive means including means for interrupting the drive applied to said device upon its arriving in the vicinity of each of said two angularly displaced positions.

12. A method for changing a gyroscopic device, which is rotatably mounted in a support, between a directional and a north seeking mode of operation, comprising the steps of:

horizontally aligning the spin axis of said gyroscopic device in a predetermined relation to the spin axis of the earth;
 generating periodic timing signals at a predetermined repetition rate; and
 rotating said gyroscopic device within its support about its spin axis by effectively advancing said device through about 90° by a succession of predetermined angular increments, each commencing upon the occurrence of each of said timing signals; and
 continuously urging said gyroscopic device upon its completing about 90° of rotation.

13. A method for changing a gyroscopic device, which is rotatably mounted in a support, between a directional and a north seeking mode of operation, comprising the steps of:

horizontally aligning the spin axis of said gyroscopic device in a predetermined relation to the spin axis of the earth;
 rotating said gyroscopic device within its support about its spin axis by electromechanically advancing said device through about 90°; and
 mechanically urging said gyroscopic device, after it electromechanically advances a predetermined amount, to continue rotating in the same direction toward a fixed position.

* * * * *